Patented July 9, 1946

2,403,772

UNITED STATES PATENT OFFICE 2,403,772

PRODUCTION OF ORGANIC HYDROPEROXIDES

William E. Vaughan and Frederick F. Rust, Berkeley, Calif., assignors to Shell Development Company, San Francisco, Calif., a corporation of Delaware No Drawing. Application November 15, 1943, Serial No. 510,421

8 Claims. (Cl. 260—610)

The present invention relates to the production of organic hydroperoxides, and more particularly pertains to a simple and economical process for the production of organic hydroperoxides in which the organic radical is directly attached to the peroxy radical via a tertiary carbon atom, i. e. one which is also directly bound to three other carbon atoms. In one of its more specific embodiments the present invention is directed to a process for the production of high yields of tertiary alkyl hydroperoxides.

Methods for producing alkyl hydroperoxides have been known for some time. According to one known process a pure neutral dialkyl sulfate was reacted with an alkali peroxide or with hydrogen peroxide in the presence of an alkali. However, because of the difficulty inherent in producing neutral dialkyl sulfates, this method has been found to be of very limited utility. Another known method comprises reacting a monoalkyl sulfate with hydrogen peroxide followed by the neutralization of the non-aqueous portion of the reaction product and the recovery of the alkyl peroxide therefrom. Still another method comprises the production of hydroperoxides from the corresponding alcohols by treating the latter with hydrogen peroxide in the presence of certain dehydrating agents. All of these known methods require the use of costly starting or intermediate materials, e. g. hydrogen peroxide.

It is therefore one of the objects of the present invention to avoid the above and other defects and to provide a novel and economical process whereby high yields of tertiary organic hydroperoxides, i. e. hydroperoxides in which the organic radical is directly attached to the peroxy radical via a tertiary carbon atom, may be obtained. A further object of the invention is to provide a process for the production of high yields of the above mentioned and hereinbelow more fully described class of organic hydroperoxides to the substantial exclusion of other oxygenated organic compounds.

The oxidation of various hydrocarbons has been effected for a number of years both non-catalytically and in the presence of various catalysts. As a general rule, most if not all of these oxidations resulted in considerable decomposition of the hydrocarbons, i. e. cleavage of carbon-to-carbon bonds of the organic starting material. Also, the products of reaction of such oxidations contained various percentages of hydrocarbons which had been oxidized to a greater or lesser extent. For instance, the catalytic oxidation of paraffinic hydrocarbons in accordance with the teachings of the prior art formed mixtures containing various percentages of carbon monoxide, carbon dioxide, olefins, water, as well as some aldehydes, alcohols, acids, acetals, esters, ketones and other hydrocarbon-oxygen compounds. Similarly, the catalytic oxidation of aromatic hydrocarbons, e. g. toluene, in accordance with the teachings of the prior art frequently formed mixtures containing various percentages of saturated and unsaturated hydrocarbons, saturated and unsaturated aliphatic and aromatic aldehydes, ketones, lactones, alcohols and other oxygenated compounds such as carbon dioxide. Furthermore, these various oxygenated compounds formed during the oxidation of various hydrocarbons according to the teachings of the prior art usually contained varied numbers of carbon atoms per molecule due to the carbon-to-carbon bond scission, as well as to other side reactions such as polymerization, condensation and the like. Although most of the oxygenated organic compounds formed as a result of partial oxidation of hydrocarbons are generally more valuable than the primary materials subjected to the oxidation reaction, the subsequent fractionations of the reaction mixtures and the separate recovery of the individual compounds therefrom are frequently very difficult, if not commercially impossible, or at least greatly increase the cost of the final product or products.

A further object of the present invention is to provide a process whereby organic compounds containing a tertiary carbon atom of aliphatic character may be oxidized to produce predominantly the corresponding organic hydroperoxides having the same number of carbon atoms per molecule as the starting material, as well as organic peroxides the molecules of which have twice the number of carbon atoms as the starting material, to the substantial exclusion of other products of oxidation which are normally formed when various organic compounds, such as hydrocarbons, are subjected to oxidation in accordance with the processes of the prior art. Still another object is to provide a novel process for the controlled oxidation of hydrocarbons, particularly of saturated aliphatic hydrocarbons containing at least one tertiary carbon atom, to produce the corresponding tertiary alkyl hydroperoxides to the substantial exclusion of oxygenated compounds having a lesser number of carbon atoms per molecule than present in the organic compound subjected to treatment. Still other objects of the invention will become apparent from the following description.

It has now been discovered that the above and other objects may be attained by effecting the partial and controlled oxidation in the presence of a catalyst comprising or consisting of of a hydrogen halide, particularly hydrogen bromide or hydrogen chloride. More specifically stated, the invention resides in the controlled non-explosive oxidation of hydrocarbons containing at least one tertiary carbon atom of aliphatic character in the presence of hydrogen bromide or hydrogen chloride, or of a compound capable of yielding such a hydrogen halide under the operating conditions. In one of its more specific embodiments the invention resides in the production of substituted and unsubstituted tertiary alkyl hydroperoxides by subjecting the above mentioned and hereinbelow more fully described class of organic compounds, containing a tertiary carbon atom of aliphatic character, to the action of oxygen or an oxygen-containing or oxygen-yielding material, in the presence of hydrogen bromide or a substance capable of yielding hydrogen bromide under the operating conditions, this oxidation being effected at temperatures and pressures below those capable of causing spontaneous combustion and therefore the resultant decomposition of the carbon structure of the starting organic material.

The above outlined invention is predicated on the discovery that the presence of a hydrogen halide, and particularly hydrogen bromide, during the oxidation of the defined class of organic compounds controls the oxidation reaction so that the oxidation occurs on the carbon atom or atoms to which a halogen atom would usually attach itself if the starting organic material were subjected to a halo-substitution reaction. Furthermore, it has been found that the presence of hydrogen bromide, or the like, besides retarding the explosion or complete combustion of the organic starting material, has the effect of inhibiting decomposition of the carbon structure of such starting materials, so that the resultant oxygenated compounds contain at least the same number of carbon atoms per molecule as the starting organic material.

As stated, the organic compounds which may be oxidized in accordance with the process of the present invention contain a tertiary carbon atom of aliphatic character, and may therefore be generally represented by the formula

wherein each R represents a like or different alkyl, aryl, aralkyl, alicyclic or heterocyclic radical, two of which together may form an alicyclic ring compound, and which radicals may be further substituted, for instance, by the presence of one or more halogen, nitrogen or oxygen atoms which are attached to one or more of the carbon atoms of such radicals. The preferred class of organic compounds which may be used as the starting material comprises the saturated aliphatic hydrocarbons containing at least one tertiary carbon atom, as well as their halo-substituted derivatives in which the halogen atom or atoms are attached to any one or several carbon atoms of the various alkyl radicals attached to the tertiary carbon atom which latter carries a replaceable hydrogen atom. The following is a non-limiting representative list of saturated aliphatic hydrocarbons (containing at least one tertiary carbon atom) which may be oxidized according to the process of the invention: isobutane, 2-methyl butane, 2-ethyl butane, 2-methyl pentane, 3-methyl pentane, 2,3-dimethyl butane, 2,4-dimethylpentane, and their homologues, as well as their halogenated derivatives in which the halogen atom or atoms are attached to the primary or secondary carbon atoms so that the tertiary carbon atom or atoms contain a replaceable hydrogen atom. The following are examples of such halogenated derivatives: 1-halo-2-methyl propane, 1-halo-2-ethyl propane, 1-halo-2-methyl butane, 1-halo-3-methyl butane, 2-halo-3-methyl butane, and the like, and their homologues. Also, one or more of the aliphatic radicals attached to the tertiary carbon atom may be substituted by an aryl or aralkyl radical. As examples of such compounds reference may be made to isopropyl benzene, 1-phenyl-1-methyl propane, 1-phenyl-2-methyl propane, and the like.

Instead of employing individual members of the above-mentioned class of organic compounds containing at least one tertiary carbon atom of aliphatic character, the present process is also applicable, at least in some instances, to the controlled oxidation of mixtures of compounds of this class, as well as mixtures containing one or more of the organic compounds of the above defined class together with one or more other organic compounds, the oxidation of such mixtures when effected in accordance with the process of the present invention resulting in the production of mixtures of the corresponding organic hydroperoxides.

It was stated above that the slow (i. e. non-explosive) controlled oxidation of the above outlined class of organic compounds is effected in accordance with the present invention at temperatures below those at which spontaneous combustion or substantial decomposition of the carbon structure occurs. This upper temperature limit will at least in part depend on the specific organic substance treated, as well as on the proportions thereof and of the oxygen and hydrogen bromide present in the vaporous mixture subjected to the elevated temperatures. Generally speaking, this upper temperature limit is in the neighborhood of about 200° C. However, some of the more stable organic compounds of the defined class may be heated together with oxygen and hydrogen bromide to higher temperatures, e. g. about 250° C. and higher, particularly in the presence of inert diluents, without causing the mixture to decompose with the concurrent formation of high yields of carbon. In this connection it is to be noted that excessively high temperatures, even though they may be below the explosive region, should be avoided because of certain undesirable side reactions such as excessive conversion of hydrogen bromide to organic bromides. This in itself is not detrimental because the organic bromides themselves may be treated in accordance with the present invention to form halogen-free oxygenated organic compounds and hydrogen bromide (so that in effect at least a portion of the hydrogen halide is regenerated and may be re-used). Nevertheless, the excessive formation of organic bromides during the controlled oxidation of a given organic compound, e. g. a saturated aliphatic hydrocarbon containing a tertiary carbon atom, is undesirable because this decreases the catalyst concentration and therefore may affect the yield or output of the desired oxygenated product or products. As stated, the upper temperature limit is generally in the neighborhood of about 200° C. However, with shorter contact periods this temperature may be raised above the mentioned limit. Nevertheless, some of the more readily oxidizable compounds may be economically oxidized according to the present process at lower temperatures, e. g. about 150° C. and lower. With a further decrease in the operating temperature the output of desired product per unit of time will decrease so that at temperatures of below about 100° C. the controlled oxidation in the presence of hydrogen halides, or substances capable of yielding them under the operating conditions, may become uneconomical.

The reaction may be effected in the liquid or vapor phase, or in a two-phase liquid-vapor system. Since it is difficult to maintain a desirable relatively high oxygen concentration when the reaction is conducted in the liquid phase, it is generally preferable to effect the oxidation according to the present invention in the vapor phase. Since some of the relatively higher boiling hydrocarbons containing a tertiary carbon atom of aliphatic character, which hydrocarbons may or may not contain halogenated substituents, cannot be effectively maintained in the vapor phase and in contact with sufficient concentrations of oxygen and of hydrogen halide without causing spontaneous combustion, the oxidation of such compounds may be readily effected in the presence of inert diluents such as steam, nitrogen, carbon dioxide, and even methane, which latter is relatively stable at temperatures at which other mentioned hydrocarbons and their corresponding halogenated derivatives may be oxidized according to the invention. Of the above diluents, the use of steam is believed to be most advantageous because the hydrogen halide, e. g. hydrogen bromide, may then be removed from the reaction mixture as an overhead fraction in the form of its constant boiling mixture of hydrogen bromide and water.

Although the volumetric ratios of the organic starting material to the oxygen may vary within relatively wide limits, it may be stated that satisfactory yields of the desired hydroperoxides, such as the tertiary alkyl hydroperoxides, may be obtained by using equivolumetric quantities thereof. An increase in the ratio of oxygen to the organic material in the treated mixture may increase the yield of the hydroperoxides containing the same number of carbon atoms per molecule as the treated organic compound. Any undue increase in this ratio is generally dangerous because of excessive explosion hazards. On the other hand, the use of oxygen-to-hydrocarbon ratios considerably below equivolumetric will lower the output of the desired organic peroxides per unit of time because of the presence of less oxygen per unit of space. This renders the process less economical. However, the process is still operable and, in fact, it must be noted that a lowering of the oxygen-to-hydrocarbon or oxygen-to-organic compound ratio may cause a more rapid consumption of oxygen per unit of time. It was stated above that satisfactory yields of the desired organic hydroperoxides may be obtained when equivolumetric mixtures of oxygen and the specified organic starting material containing a tertiary carbon atom of aliphatic character are subjected to the action of hydrogen bromide at the operating temperature specified herein. Such mixtures usually present no hazards as far as explosions are concerned, the hydrogen halide apparently acting as an explosion retardant or inhibitor.

The amount of hydrogen halide, i. e. hydrogen bromide or hydrogen chloride, employed as the catalyst may also vary within relatively wide limits. In this connection it has been found that the use of relatively high concentrations of the hydrogen halide tends to favor the production of high yields of di(tertiary organic) peroxides, whereas with relatively lower hydrogen halide concentrations—other conditions being maintained equal—the reaction mixture predominates in the desired organic hydroperoxides. Generally speaking, when a hydrogen halide, e. g. hydrogen bromide, concentration is below about 10%, i. e. when such hydrogen halide comprises less than 10% of the total mixture present in the reaction zone, the reaction mixture formed by such catalytic oxidation in accordance with the process of the present invention predominates in organic hydroperoxides having the same number of carbon atoms per molecule as the starting organic material, the use of higher hydrogen halide concentrations resulting in the formation of reaction mixtures containing proportionally greater amounts of the corresponding di-organic peroxides, i. e. peroxides in which each of the peroxy oxygen atoms is attached to an organic radical via a tertiary carbon atom of aliphatic character, these peroxides having twice as many carbon atoms per molecule as the organic material subjected to oxidation. When the volumetric or molal concentration of the hydrogen bromide in the reaction mixture subjected to oxidation is increased above about 20%, such an increase of the catalyst concentration does not have a marked effect on the percentage of oxygen which will react, or on the yield of the peroxides. It has been found that satisfactory yields of the desired organic hydroperoxides may be obtained in accordance with the process of the present invention when the hydrogen halide concentration is below the aforementioned 10%, and preferably between about 4% and 6%. However, higher or lower concentrations of the catalyst may be employed. In fact, the use of lower concentrations, e. g. about 2%, may be advantageous, particularly for the treatment of certain of the organic starting materials containing a tertiary carbon atom of aliphatic character. Also, the use of superatmospheric pressures tends to favor the formation of the desired hydroperoxides so that comparable yields of the desired peroxides may be obtained with lower hydrogen halide concentrations when the reaction is effected at superatmospheric pressures. It must be noted that even with relatively high hydrogen halide concentrations, i. e. those above 10 mol per cent and even those approaching or exceeding 20 mol per cent, some hydroperoxides are formed. Nevertheless, as stated, the increase in the catalyst concentration tends to favor the formation of peroxides containing two organic radicals attached to the peroxy oxygen atoms.

It was pointed out that the yields of the desired hydroperoxides are increased when the reaction is effected at superatmospheric pressures. However, the process may also be effected at atmospheric or even subatmospheric pressures. The use of superatmospheric pressures is preferred not only because it permits the utilization of lower hydrogen halide catalyst concentrations, but also because more of the mixture subjected to treatment may be conveyed through a given unit of reaction space per unit of time.

The invention may be executed in a batch, intermittent or continuous manner. When operating in a continuous system, all of the reactants as well as the diluents, if diluents are used, and the catalyst may be first mixed together, and the mixture may then be conveyed through the whole length of the reaction zone. In the alternative, it is possible to introduce at least a portion of the catalyst and/or of one or both of the reactants, i. e. oxygen and the organic material subjected to oxidation, at various intermediate points along the reaction zone. Such operation may be frequently desirable to control the operating conditions in the reaction zone. Generally, the contact time may vary within relatively wide limits and is at least in part dependent on the other operating conditions such as specific starting material, the ratios thereof to the oxygen and/or the catalyst, the presence or absence of inert diluents, the operating temperatures and pressures, etc. In a continuous system it has been found that satisfactory yields of the desired organic hydroperoxides may be obtained with contact periods of between about 1 and about 3 minutes. Nevertheless, shorter or longer contact times may also be employed, particularly dependent on the specific organic material treated and the hydrogen halide concentration in the reaction mixture.

Instead of using pure or substantially pure oxygen for the oxidation in accordance with the process of the present invention it is also possible to employ oxygen-containing mixtures such as air, or even substances capable of yielding molecular oxygen under the operating conditions. Also, although the example presented hereinbelow is directed specifically to the use of hydrogen bromide as the catalyst, the process of the present invention may also be realized by using other hydrogen halides or even substances capable of yielding hydrogen halides under the operating conditions employed. For instance, satisfactory results may be obtained by the use of hydrogen chloride as the catalyst. Also, bromine and chlorine may be used to catalyze the oxidation reaction, although the formation of the desired product or products of oxidation—other conditions being equal—is comparatively slower when chlorine is employed as the catalyst.

The controlled oxidation of organic compounds containing a tertiary carbon atom of aliphatic character, when such oxidation is effected in accordance with the process of the present invention, results in the formation of organic hydroperoxides having the same number of carbon atoms per molecule as the starting organic compound, the organic radical of these hydroperoxides being attached to the peroxy oxygen atom via a tertiary carbon atom of aliphatic character. These organic hydroperoxides are the predominant reaction product when the hydrogen halide concentration is relatively low, e. g. between about 4% and about 6% of the mixture subjected to treatment. On the other hand, although some organic hydroperoxides are also formed, the use of higher hydrogen halide concentrations, particularly those in the neighborhood of and above 20%, tends to favor the formation of organic alcohols and organic peroxides having the general formula

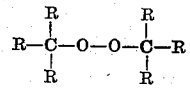

wherein each R represents a like or different alkyl, aryl, aralkyl, alkaryl, alicyclic or heterocyclic radical which may or may not be further substituted. This class of compounds, as well as the process of preparing the same, is disclosed and claimed in the copending patent application Serial No. 474,224, filed January 30, 1943, of which the present application is a continuation-in-part.

The following examples will further illustrate the various phases of the present invention, it being understood that the invention is not restricted to said examples but is co-extensive in scope with the appended claims.

*Example I*

The reactor consisted of a coil of glass tubing having an internal diameter of 25 cm. This coil had a volume equal to 2940 cc. and was immersed in an oil bath which permitted accurate control of the reaction temperature. A preheated vaporous mixture of isobutane, oxygen and hydrogen bromide, which substances were used in a volumetric ratio of 8:8:1, was then conveyed through the reactor at substantially atmospheric pressure, at a temperature of about 158° C., and at such a rate that the residence time was equal to about 3 minutes. The effluent mixture from the reactor was condensed and collected in a trap containing water. The insoluble layer was repeatedly washed with water and all of the water-soluble constituents were then combined and distilled to separate tertiary butyl hydroperoxide which boiled, together with water, at a temperature of between about 93° C. and 94° C. This fraction was then partially dried and found to consist of an 83% aqueous solution of tertiary butyl hydroperoxide. The yield of this hydroperoxide was equal to 75% based on the consumed oxygen, about 85% of the introduced oxygen having been found to have reacted.

When an equivolumetric gaseous mixture of isobutane and oxygen is subjected to the same operating conditions in the absence of a hydrogen halide, e. g. hydrogen bromide, catalyst no reaction occurs until the temperature is raised far in excess of that employed above. Even then, after very long induction periods the reaction products predominate in carbon monoxide, carbon dioxide, olefins and water, and contain only relatively small amounts of more or less oxygenated compounds, most of which contain less than 4 carbon atoms per molecule. Also, no tertiary butyl hydroperoxide or di(tertiary butyl) peroxide is formed.

*Example II*

The reactor employed in the previous example was employed, and a preheated vaporous mixture consisting of equivolumetric parts of isobutane and oxygen and of about 4% of hydrogen bromide (as calculated on the total volume of the reactants) was conveyed through this reactor at substantially atmospheric pressure, at a temperature of about 163° C. and at such a rate that the residence time was equal to about 3 minutes. This rate was such that approximately 288 cc. per minute of isobutane were conveyed through the reaction zone.

It was found that 87% of the introduced oxygen reacted to form oxygenated products and that about 88% of the isobutane was consumed. An analysis of the reaction product showed that approximately 180 cc. per minute of tertiary butyl hydroperoxide (as calculated in vapor volume) were thus formed. Only relatively small amounts of tertiary butyl alcohol and di(tertiary butyl) peroxide were recovered. Approximately 48% of the introduced hydrogen bromide was recovered as such.

By increasing the reaction pressure to one atmosphere gauge comparable results to those obtained above were attained by employing the hydrogen bromide in an amount equal to only 2% of the total volume of the reactants employed.

The above described process is also applicable to the non-explosive catalytic oxidation of other organic compounds containing a tertiary carbon atom of aliphatic character to produce the corresponding organic hydroperoxides. For instance, tertiary amyl hydroperoxide was obtained when isopentane was reacted with an equal amount of oxygen in the presence of hydrogen bromide employed in a concentration of about 6%. Similarly, chlorotertiary butyl hydroperoxide was produced by the catalytic oxidation of isobutyl chloride in accordance with the above defined process.

Although the process of the present invention has been particularly illustrated with reference to the oxidation of the above class of substituted and unsubstituted hydrocarbons by employing hydrogen bromide as the catalyst, substances of the type of bromine (which are capable of yielding the hydrogen bromide under the operating conditions) may be used in lieu of the hydrogen bromide for the controlled catalytic oxidation of the defined class of organic compounds.

We claim as our invention:

1. A process for the production of tertiary butyl hydroperoxide which comprises reacting substantially equivolumetric vaporous amounts of isobutane and oxygen, at a superatmospheric pressure and at a temperature of between about 150° C. and about 200° C., in the presence of hydrogen bromide employed in an amount of about 2 mol per cent of the total mixture, effecting the reaction for a period of time sufficient to cause a substantial reaction of the oxygen employed, and recovering tertiary butyl hydroperoxide from the reaction mixture thus formed.

2. A process for the production of tertiary butyl hydroperoxide which comprises reacting substantially equivolumetric vaporous amounts of isobutane and oxygen, at substantially atmospheric pressure and at a temperature of between about 150° C. and about 200° C., in the presence of hydrogen bromide employed in an amount of between about 4 mol per cent and about 6 mol per cent of the total mixture, effecting the reaction for a period of time sufficient to cause a substantial reaction of the oxygen employed, and recovering tertiary butyl hydroperoxide from the reaction mixture thus formed.

3. A process for the production of tertiary butyl hydroperoxide which comprises reacting a vaporous mixture comprising isobutane and oxygen in the presence of hydrogen bromide employed in an amount of up to about 10 mol per cent of the total mixture, and at a temperature of between about 150° C. and about 200° C., effecting the reaction for a period of time sufficient to cause the controlled oxidation of the isobutane, and recovering tertiary butyl hydroperoxide from the reaction mixture thus formed.

4. A process for the production of tertiary butyl hydroperoxide which comprises reacting a vaporous mixture comprising isobutane and oxygen at a temperature of between about 100° C. and the temperature at which spontaneous combustion of the mixture occurs, in the presence of hydrogen bromide employed in an amount of up to about 10 mol per cent of the total mixture, effecting said reaction for a period of time sufficient to cause the controlled catalytic oxidation of isobutane, and recovering tertiary butyl hydroperoxide from the reaction mixture thus formed.

5. A process for the production of tertiary amyl hydroperoxide which comprises reacting a vaporous mixture comprising isopentane and oxygen at a temperature of between about 100° C. and the temperature at which spontaneous combustion of the mixture occurs, in the presence of hydrogen bromide employed in an amount of up to about 10 mol per cent of the total mixture, effecting said reaction for a period of time sufficient to cause the controlled catalytic oxidation of the isopentane, and recovering tertiary amyl hydroperoxide from the reaction mixture thus formed.

6. A process for the production of tertiary alkyl hydroperoxides which comprises reacting a vaporous mixture comprising oxygen and a saturated aliphatic hydrocarbon containing a tertiary carbon atom, in the presence of hydrogen bromide employed in an amount of up to about 10 mol per cent of the total mixture, effecting said reaction at an elevated temperature which is below the spontaneous combustion temperature of the mixture, and for a period of time sufficient to cause the controlled catalytic oxidation of the hydrocarbon employed, and recovering the tertiary alkyl hydroperoxide from the resulting mixture.

7. The process according to claim 6 wherein an inert diluent is employed as a carrier to maintain the reactants in the vapor state.

8. A process for the production of an organic hydroperoxide which comprises reacting a hydrocarbon of the formula

wherein R is a radical of the group consisting of the alkyl and aryl monocyclic radicals, with oxygen in the presence of hydrogen bromide in an amount up to 10 mol per cent of the total mixture, the reaction being effected at an elevated temperature which is below the spontaneous combustion temperature of the mixture for a period of time sufficient to effect controlled oxidation of the hydrocarbon.

WILLIAM E. VAUGHAN.
FREDERICK F. RUST.